(12) United States Patent
Michaud

(10) Patent No.: US 11,307,030 B2
(45) Date of Patent: Apr. 19, 2022

(54) LASER DETECTOR MOUNTING DEVICE

(71) Applicant: Joseph Michaud, Alfred, ME (US)

(72) Inventor: Joseph Michaud, Alfred, ME (US)

(*) Notice: Subject to any disclaimer, the term of this patent is extended or adjusted under 35 U.S.C. 154(b) by 220 days.

(21) Appl. No.: 16/785,946

(22) Filed: Feb. 10, 2020

(65) Prior Publication Data

US 2021/0247184 A1    Aug. 12, 2021

(51) Int. Cl.
G01C 15/00   (2006.01)
G01C 15/06   (2006.01)

(52) U.S. Cl.
CPC ........... G01C 15/002 (2013.01); G01C 15/06 (2013.01)

(58) Field of Classification Search
USPC .................................................. 33/293–296
See application file for complete search history.

(56) References Cited

U.S. PATENT DOCUMENTS

| | | | | |
|---|---|---|---|---|
| 2,218,418 A * | 10/1940 | Cain | ............... | E04G 21/1808 33/295 |
| 5,457,890 A * | 10/1995 | Mooty | ............... | G01C 15/002 33/293 |
| 5,584,458 A * | 12/1996 | Rando | ............... | F16M 13/022 248/206.5 |
| 6,161,295 A * | 12/2000 | Mooty | ............... | G01C 15/002 33/293 |
| 6,209,832 B1 * | 4/2001 | Yamazaki | ............ | G01C 15/006 248/219.4 |
| 6,990,745 B1 * | 1/2006 | Schoenenberger | ...... | B60D 1/36 280/477 |
| 7,448,138 B1 * | 11/2008 | Vanneman | ............ | G01C 15/006 33/290 |
| 10,982,958 B2 * | 4/2021 | Lombardi | ............ | G01C 15/002 |
| 10,997,785 B2 * | 5/2021 | Pestov | ................ | G06F 16/5866 |
| 2004/0123684 A1 * | 7/2004 | Tsai | ........................ | B23Q 17/22 73/865.9 |
| 2007/0145217 A1 * | 6/2007 | Kimura | ................... | G01C 15/06 248/230.1 |
| 2011/0266425 A1 * | 11/2011 | Kallabis | ............... | G01C 15/006 250/239 |
| 2019/0323495 A1 * | 10/2019 | Zubia | .................... | F04B 53/144 |
| 2021/0291321 A1 * | 9/2021 | Weber | ..................... | G01L 5/009 |

FOREIGN PATENT DOCUMENTS

EP    2722647 A1 *   4/2014   ............ G01C 15/06

* cited by examiner

*Primary Examiner* — Christopher W Fulton
(74) *Attorney, Agent, or Firm* — The Iwashko Law Firm, PLLC; Lev Ivan Gabriel Iwashko

(57) ABSTRACT

A laser detector mounting device to mount a laser detector to a grade rod, the laser detector mounting device including a handle assembly to facilitate gripping thereof, a clamp assembly disposed on at least a portion of the handle assembly to squeeze the grade rod in a first position, and release the grade rod in a second position, a clamp trigger disposed on and within at least a portion of the handle assembly to at least partially tighten the clamp assembly in response to squeezing the clamp trigger, and a clamp release disposed on and within at least a portion of the handle assembly to at least partially loosen the clamp assembly in response to depressing the clamp release.

8 Claims, 1 Drawing Sheet

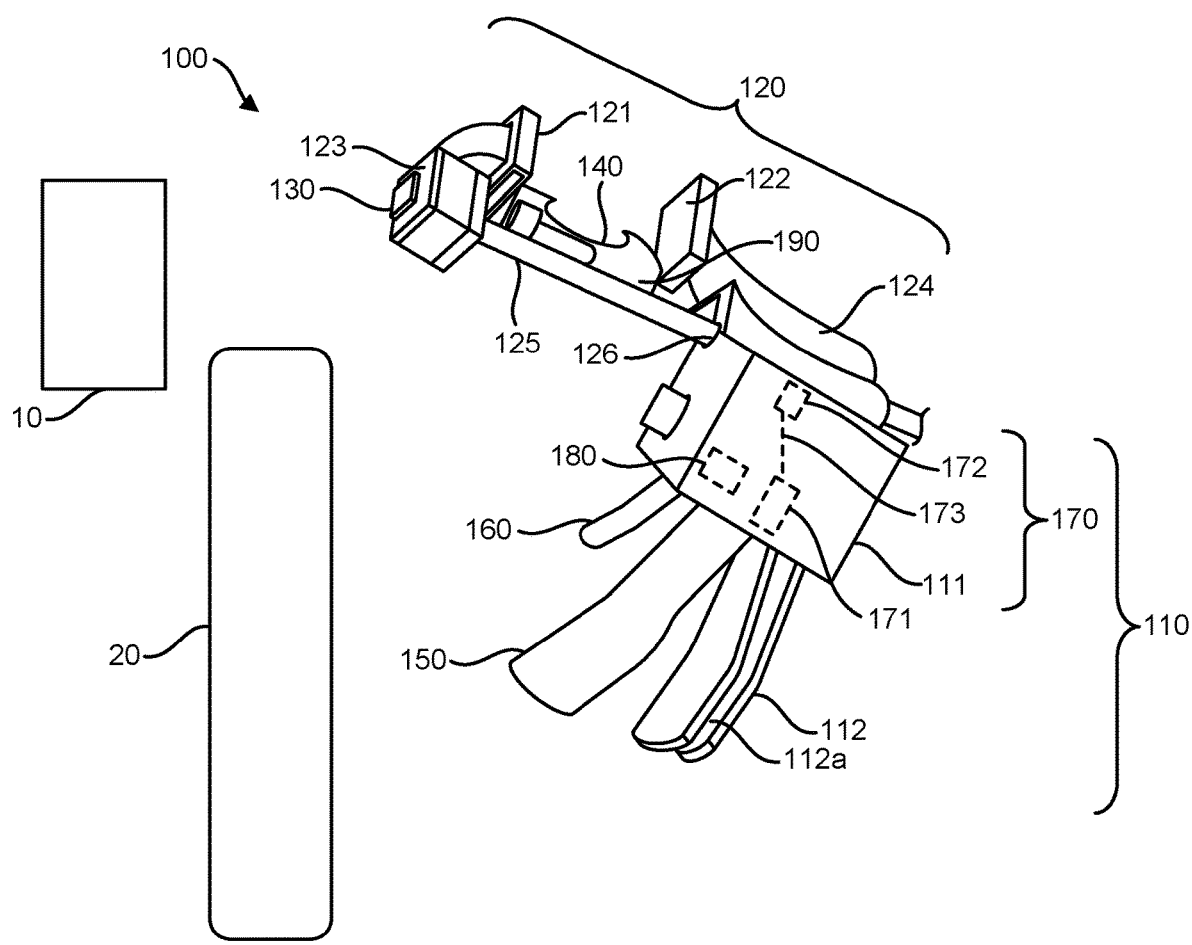

LASER DETECTOR MOUNTING DEVICE

BACKGROUND

1. Field

The present general inventive concept relates generally to a mounting device, and particularly, to a laser detector mounting device.

2. Description of the Related Art

Excavators, grading contractors, construction workers, and farmers use a grade laser on a regular basis in order to determine differences in elevation. A signal from the grade laser must be read at a distance by a laser detector mounted on a grade rod. The foot of the calibrated grade rod is set at a point of known elevation, and the detector is then slid up or down the grade rod until it detects the signal from the grade laser. The laser detector must be clamped securely to the grade rod at that level so that the elevation can be read of the scale.

All existing laser detectors employ a screw clamp to secure the laser detector to the grade rod. Operation of this screw clamp is both time consuming and cumbersome. It effectively requires the use of three hands: a first hand to hold the grade rod, a second hand to hold the laser detector, and a third hand to operate the screw that tightens the clamp. This operation can become a major issue when one is constantly changing and figuring grades, and it is problematic when the measurement falls on a joint in the telescopic grade rod. The joint is necessarily wider than the rest of the grade rod, causing more time and work unscrewing and then re-securing the clamp.

Therefore, there is a need for a laser detector mounting device that is adjustable without having to screw a clamp.

SUMMARY

The present general inventive concept provides a laser detector mounting device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a laser detector mounting device to mount a laser detector to a grade rod, the laser detector mounting device including a handle assembly to facilitate gripping thereof, a clamp assembly disposed on at least a portion of the handle assembly to squeeze the grade rod in a first position, and release the grade rod in a second position, a clamp trigger disposed on and within at least a portion of the handle assembly to at least partially tighten the clamp assembly in response to squeezing the clamp trigger, and a clamp release disposed on and within at least a portion of the handle assembly to at least partially loosen the clamp assembly in response to depressing the clamp release.

The clamp assembly may be perpendicular to the handle assembly with respect to a direction.

The clamp assembly may include an extended member, a clamp rod disposed at a first end on the extended member to move the extended member, and a clamp body disposed at a second end of the clamp rod to receive the clamp rod therethrough.

The laser detector mounting device may further include a detector fastener disposed on at least a portion of the extended member to connect to the laser detector. The laser detector mounting device may further include a rod receiving member disposed on at least a portion of the handle assembly and the clamp assembly to envelop the grade rod.

The rod receiving member may be arcuately shaped.

The laser detector mounting device may further include a scale reader disposed on at least a portion of the clamp assembly to facilitate reading of a laser height measurement on the grade rod.

The scale reader may be a holographic display unit.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a rear perspective view of a laser detector mounting device, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the FIGURE, the thicknesses of lines, layers and/or regions may be exaggerated for clarity.

Accordingly, while example embodiments are capable of various modifications and alternative forms, embodiments thereof are shown by way of example in the FIGURE and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Laser Detector Mounting Device 100
Handle Assembly 110
Body Portion 111
Handle Portion 112
Trigger-Receiving Groove 112*a*
Clamp Assembly 120
First Clamp 121
Second Clamp 122
Extended Member 123
Clamp Body 124
Clamp Rod 125
Rod Aperture 126
Detector Fastener 130
Rod Receiving Member 140
Clamp Trigger 150
Clamp Release 160
Gear Assembly 170
Trigger Gear 171
Rod Gear 172
Gear Connecting Rod 173
Spring 180
Scale Reader 190

FIG. 1 illustrates a rear perspective view of a laser detector mounting device 100, according to an exemplary embodiment of the present general inventive concept.

The laser detector mounting device 100 may be constructed from at least one of metal, plastic, wood, glass, and rubber, etc., but is not limited thereto.

The laser detector mounting device 100 may include a handle assembly 110, a clamp assembly 120, a detector fastener 130, a rod receiving member 140, a clamp trigger 150, a clamp release 160, a gear assembly 170, a spring 180, and a scale reader 190, but is not limited thereto.

The handle assembly 110 may include a body portion 111 and a handle portion 112, but is not limited thereto.

The body portion 111 may have a predetermined size based on a preference of a user. However, the body portion 111 may store a plurality of operational mechanisms therein.

The handle portion 112 may include a trigger-receiving groove 112*a*, but is not limited thereto.

The handle portion 112 may be disposed on at least a portion of an outer surface of the body portion 111 to extend away from the outer surface of the body portion 111. Moreover, the handle portion 112 may facilitate gripping thereof.

The clamp assembly 120 may include a first clamp 121, a second clamp 122, an extended member 123, a clamp body 124, a clamp rod 125, and a rod aperture 126, but is not limited thereto.

The clamp assembly 120 may be disposed on at least a portion of the handle assembly 110.

The first clamp 121 and the second clamp 122 may have a textured surface, such as a plurality of bubble protrusions extending away therefrom and/or a rubber surface to increase friction, such that the first clamp 121 and the second clamp 122 may prevent movement against at least one object therebetween.

Referring to FIG. 1, the first clamp 121 may be disposed on at least a portion of the extended member 123. The second clamp 122 may be disposed on at least a portion of the clamp body 124. Additionally, the first clamp 121 and the second clamp 122 may be disposed in parallel with respect to each other. Also, the first clamp 121 and the second clamp 122 may be perpendicularly disposed away from the handle assembly 110 with respect to a direction. In other words, for example, the handle assembly 110 may be perpendicularly oriented with respect to a ground surface, and the first clamp 121 and the second clamp 122 may be in parallel with respect to the ground surface during use.

The clamp rod 125 may be disposed within the rod aperture 126 to extend a distance away from the clamp body 124. Also, the extended member 123 may be disposed at a first end of the clamp rod 125 and the clamp body 124 may be disposed at a second end of the clamp rod 125. Furthermore, the clamp rod 125 may move within the rod aperture 126 to move the extended member 123. As such, the clamp body 124 may receive the clamp rod 125 therethrough.

The detector fastener 130 may include a twine, a string, a rope, a magnet, a clasp, a hook, a screw, a nail, a bolt, a nut, a washer, and/or any combination thereof, but is not limited thereto.

The detector fastener 130 may be disposed on at least a portion of the extended member 123 to connect to a laser detector 10, such that the laser detector 10 may be prevented from movement. The detector fastener 130 may be disposed on the extended member 123 to prevent any damage from a laser on the rest of the laser detector mounting device 100, and reduces interference from the user during operation due to being on an end of the laser detector mounting device 100.

Referring again to FIG. 1, the rod receiving member 140 may be disposed on at least a portion of the handle assembly 110 and/or the clamp assembly 120, different with respect to the first clamp 121 and the second clamp 122. For example, the rod receiving member 140 may be disposed below the first clamp 121 and the second clamp 122. Also, the rod receiving member 140 may be oriented in parallel with respect to the ground surface. Moreover, the rod receiving member 140 may receive a grade rod 20 therein. Specifically, the rod receiving member 140 may be arcuately shaped to snugly fit the grade rod 20, such that the rod receiving member 140 may at least partially envelop the grade rod 20. Accordingly, the first clamp 121 and the second clamp 122 may also at least partially envelop the grade rod 20 at a different position than the rod receiving member 140.

The clamp trigger 150 may be disposed on and/or within at least a portion of the handle assembly 110. The clamp trigger 150 may be moved (i.e. squeezed) toward and/or into the trigger-receiving groove 112*a*, such that the clamp rod 125 moves in response to squeezing the clamp trigger 150. Furthermore, the first clamp 121 and the extended member 123 may move toward the second clamp 122 and the clamp body 124, respectively, in response to movement of the clamp rod 125. As such, the first clamp 121 and the second clamp 122 may at least partially close a grip around the grade rod 20 in a first position to prevent the laser detector mounting device 100 from movement.

The clamp release 160 may include a button, a lever, and a switch, but is not limited thereto.

The clamp release 160 may be disposed on and/or within at least a portion of the handle assembly 110. The clamp release 160 may be depressed to release the clamp rod 125, such that the clamp rod 125 may extend based on a duration the clamp release 160 is depressed. In other words, the clamp rod 125 may extend longer in response to depressing the clamp release 160 for a longer duration than a shorter duration, such as depressing the clamp release 160 for five seconds versus two seconds. As such, the clamp release 160 may be depressed to at least partially release and/or loosen the grip of the first clamp 121 with respect to the second clamp 122 around the grade rod 20 in a second position, such that the laser detector mounting device 100 may be adjusted along the grade rod 20.

The gear assembly 170 may include a trigger gear 171, a rod gear 172, and a gear connecting rod 173, but is not limited thereto.

The gear assembly 170 may be disposed within at least a portion of the handle assembly 110 and the clamp assembly 120. The trigger gear 171 may be connected to the clamp trigger 150. The rod gear 172 may be connected to the clamp rod 125. More specifically, the clamp rod 125 may be disposed through a center portion of the rod gear 172 and/or an outer surface of the clamp rod 125 may be threaded to connect to at least on tooth of the rod gear 172. The gear connecting rod 173 may connect to the trigger gear 171 at a first end and the rod gear 172 at a second end.

Furthermore, the trigger gear 171 may at least partially rotate in response to squeezing the clamp trigger 150. The gear connecting rod 173 may at least partially rotate in response to a rotation of the trigger gear 171. Accordingly, the rod gear 172 may rotate in response to another rotation of the gear connecting rod 173. The trigger gear 171 may rotate a predetermined distance in response to squeezing the clamp trigger 150, such that additional squeezing of the clamp trigger 150 may be necessary to move the first clamp 121 toward the second clamp 122, such that the laser detector mounting device 100 may not move along the grade rod 20.

Alternatively, the gear assembly 170 may be a hydraulic system and/or a pneumatic system, such that the gear assembly 170 uses compressed air and/or liquid to manipulate the clamp assembly 120 in response to squeezing the clamp trigger 150.

The spring 180 may be disposed within at least a portion of the handle assembly 110. The spring 180 may be coiled around another rod connected to the trigger gear 171 to prevent the trigger gear 171 from reverse movement.

However, the clamp release 160 may move the another rod away from the trigger gear 171, such that the spring 180 may reverse the trigger gear 171, such that the clamp rod 125 may extend, and the first clamp 121 may loosen with respect to the second clamp 122.

The scale reader 190 may be disposed on at least a portion of the clamp assembly 120. The scale reader 190 may be a translucent glass with a colored scale to facilitate reading of a laser height measurement on the grade rod 20.

Alternatively, the scale reader 190 may be a holographic display unit, such that the laser height measurement may be projected above a surface of the scale reader, such that the user may view the laser height measurement at a distance away from the scale reader 190.

Therefore, the laser detector mounting device 100 may be an ideal solution for adjusting the laser detector 10 due to requiring one hand to manipulate a position on the grade rod 20. The laser detector mounting device 100 may be used by individuals that perform surveying, grading, farming, and construction.

The present general inventive concept may include a laser detector mounting device 100 to mount a laser detector 10 to a grade rod 20, the laser detector mounting device 100 including a handle assembly 110 to facilitate gripping thereof, a clamp assembly 120 disposed on at least a portion of the handle assembly 110 to squeeze the grade rod 20 in a first position, and release the grade rod 20 in a second position, a clamp trigger 150 disposed on and within at least a portion of the handle assembly 110 to at least partially tighten the clamp assembly 120 in response to squeezing the clamp trigger 150, and a clamp release 160 disposed on and within at least a portion of the handle assembly 110 to at least partially loosen the clamp assembly 120 in response to depressing the clamp release 160.

The clamp assembly 120 may be perpendicular to the handle assembly 110 with respect to a direction.

The clamp assembly 120 may include an extended member 123, a clamp rod 125 disposed at a first end on the extended member 123 to move the extended member 123, and a clamp body 124 disposed at a second end of the clamp rod 125 to receive the clamp rod 125 therethrough.

The laser detector mounting device 100 may further include a detector fastener 130 disposed on at least a portion of the extended member 123 to connect to the laser detector 10.

The laser detector mounting device 100 may further include a rod receiving member 140 disposed on at least a portion of the handle assembly 110 and the clamp assembly 120 to envelop the grade rod 20.

The rod receiving member 140 may be arcuately shaped.

The laser detector mounting device 100 may further include a scale reader 190 disposed on at least a portion of the clamp assembly 120 to facilitate reading of a laser height measurement on the grade rod 120.

The scale reader 190 may be a holographic display unit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A laser detector mounting device to mount a laser detector to a grade rod, the laser detector mounting device comprising:
   a handle assembly to facilitate gripping thereof;
   a clamp assembly disposed on at least a portion of the handle assembly, the clamp assembly comprising:
      a first clamp, and
      a second clamp disposed away from the first clamp, such that the first clamp moves toward the second clamp to the squeeze the grade rod in a first position, and release the grade rod in a second position;
   a clamp trigger disposed on and within at least a portion of the handle assembly to at least partially tighten the clamp assembly in response to squeezing the clamp trigger;
   a clamp release disposed on and within at least a portion of the handle assembly to at least partially loosen the clamp assembly in response to depressing the clamp release; and
   a rod receiving member disposed on at least a portion of the handle assembly between the first clamp and the second clamp while the first clamp is at partially disposed away from the second clamp to envelop the grade rod.

2. The laser detector mounting device of claim 1, wherein the clamp assembly is perpendicular to the handle assembly with respect to a direction.

3. The laser detector mounting device of claim 1, wherein the clamp assembly comprises:
   an extended member;
   a clamp rod disposed at a first end on the extended member to move the extended member; and
   a clamp body disposed at a second end of the clamp rod to receive the clamp rod therethrough.

4. The laser detector mounting device of claim 3, further comprising:
   a detector fastener disposed on at least a portion of the extended member to connect to the laser detector.

5. The laser detector mounting device of claim 1, wherein the rod receiving member is arcuately shaped.

6. The laser detector mounting device of claim 1, further comprising:
   a scale reader disposed on at least a portion of the clamp assembly to facilitate reading of a laser height measurement on the grade rod.

7. The laser detector mounting device of claim 6, wherein the scale reader is a holographic display unit.

8. A laser detector mounting device to mount a laser detector to a grade rod, the laser detector mounting device comprising:
   a handle assembly to facilitate gripping thereof;
   a clamp assembly disposed on at least a portion of the handle assembly to squeeze the grade rod in a first position, and release the grade rod in a second position;
   a clamp trigger disposed on and within at least a portion of the handle assembly to at least partially tighten the clamp assembly in response to squeezing the clamp trigger;
   a clamp release disposed on and within at least a portion of the handle assembly to at least partially loosen the clamp assembly in response to depressing the clamp release;
   a gear assembly disposed within at least a portion of the handle assembly and the clamp assembly to move the clamp assembly in response to moving the clamp trigger; and
   a spring disposed within at least a portion of the handle assembly to prevent the gear assembly from reverse movement.

* * * * *